No. 818,196. PATENTED APR. 17, 1906.
L. A. ROCKWELL & J. J. LINDEN.
DOUGH BREAKER.
APPLICATION FILED DEC. 8, 1905.
2 SHEETS—SHEET 1.
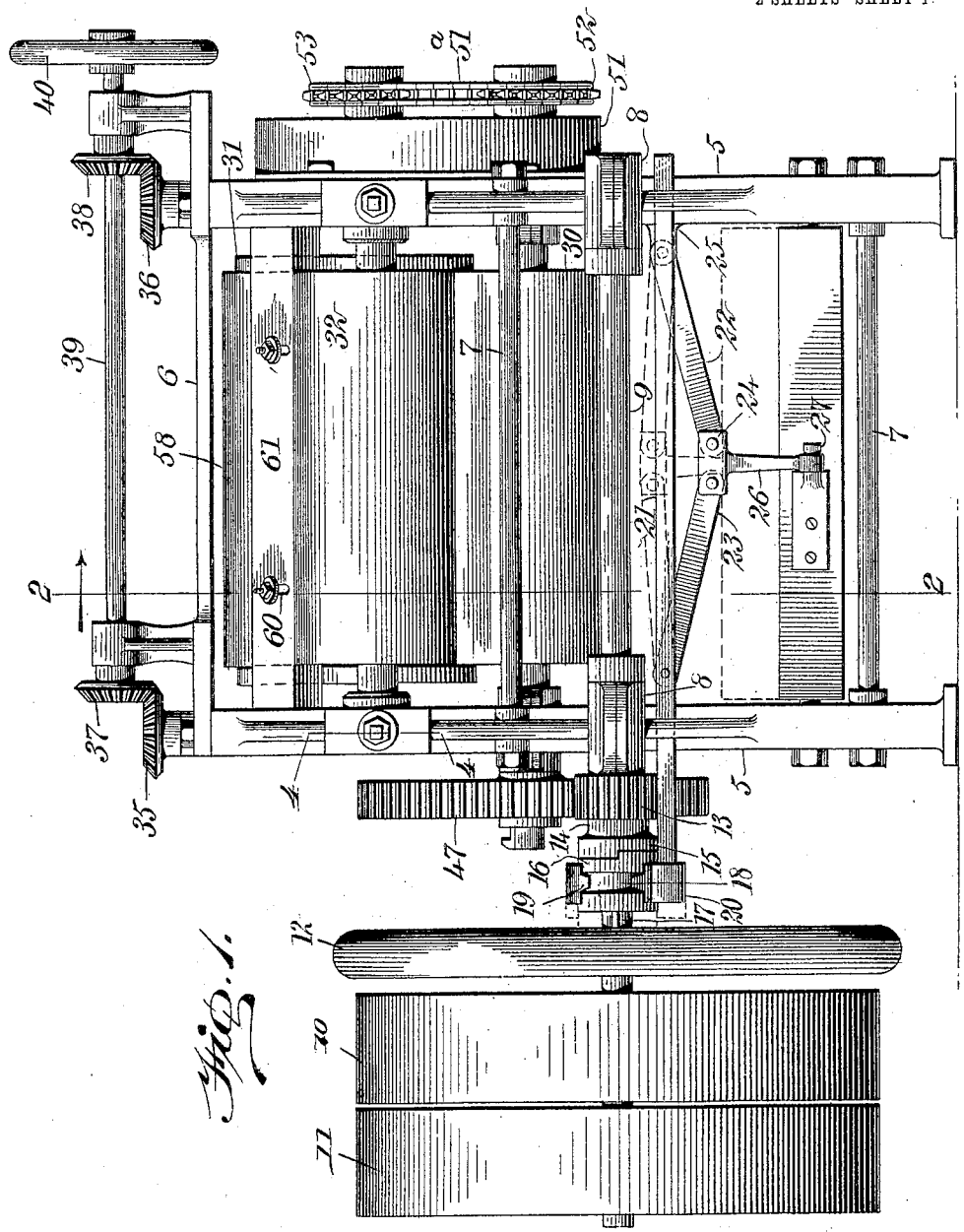
WITNESSES:
INVENTORS
Lucius A. Rockwell
John J. Linden
BY
ATTORNEYS No. 818,196. PATENTED APR. 17, 1906.
L. A. ROCKWELL & J. J. LINDEN.
DOUGH BREAKER.
APPLICATION FILED DEC. 8, 1905.
2 SHEETS—SHEET 2.
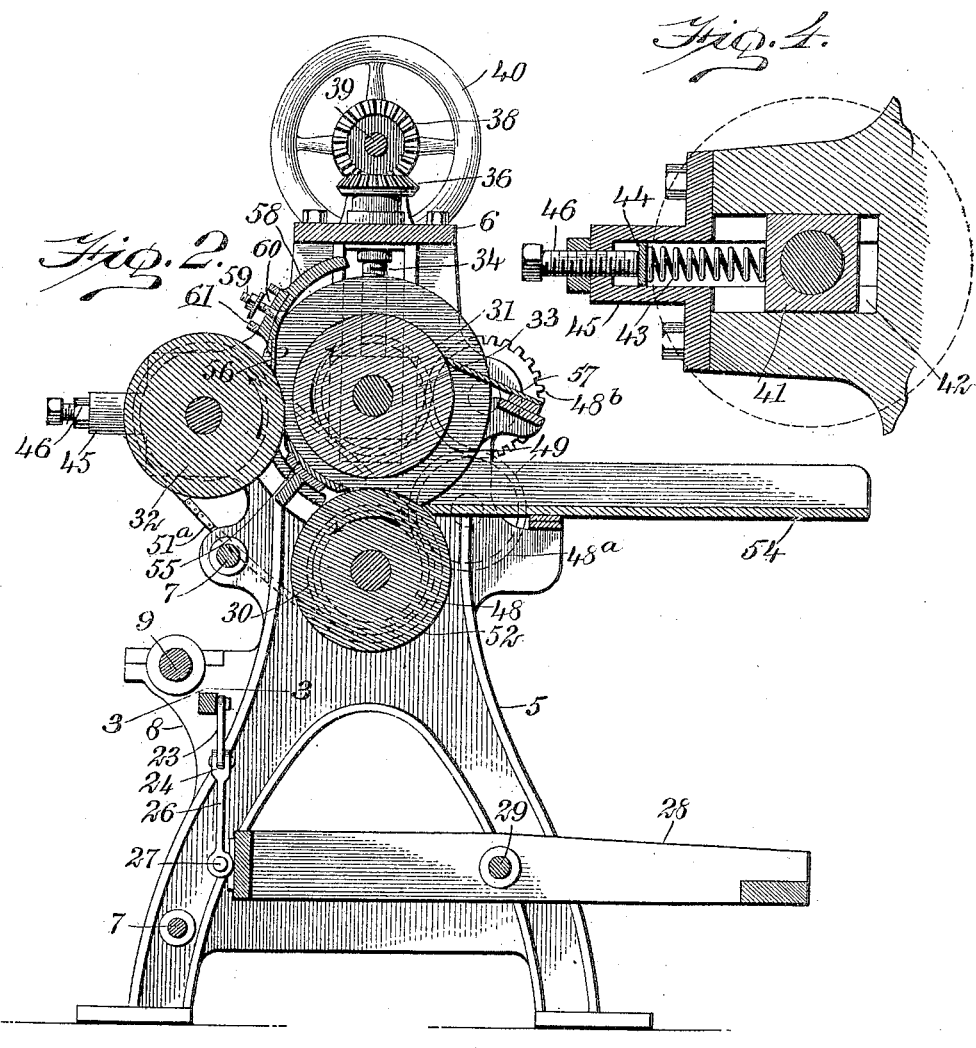
WITNESSES:
INVENTORS
Lucius A. Rockwell
John J. Linden
BY
ATTORNEYS

UNITED STATES PATENT OFFICE.

LUCIUS A. ROCKWELL AND JOHN J. LINDEN, OF NEW YORK, N. Y.;
SAID LINDEN ASSIGNOR TO SAID ROCKWELL.

DOUGH-BREAKER.

No. 818,196.  Specification of Letters Patent.  Patented April 17, 1906.

Application filed December 8, 1905. Serial No. 290,957.

*To all whom it may concern:*

Be it known that we, LUCIUS A. ROCKWELL, residing in the borough of the Bronx, and JOHN J. LINDEN, residing in the borough of Manhattan, city of New York, in the county and State of New York, citizens of the United States, have invented a new and Improved Dough-Breaker, of which the following is a full, clear, and exact description.

This invention relates to improvements in machines for breaking dough for bread-making or the like, the object being to provide, in connection with a machine of this character, a safety device by means of which the operation of the machine may be instantly stopped while the driving-shaft continues in motion should accident or other cause require the stopping.

We will describe a dough-breaker embodying our invention and then point out the novel features in the appended claims.

Reference is to be had to the accompanying drawings, forming a part of this specification, in which similar characters of reference indicate corresponding parts in all the figures.

Figure 1 is a rear elevation of a dough-breaker embodying our invention. Fig. 2 is a section on the line 2 2 of Fig. 1. Fig. 3 is a section on the line 3 3 of Fig. 2, and Fig. 4 is a section on the line 4 4 of Fig. 1.

The frame of the machine comprises side uprights 5, connected at the top by a cross-plate 6 and brace-bars 7, also connected with the uprights at suitable intervals. Having bearings in brackets 8 on the rear side of the uprights 5 is a main driving-shaft 9, on which fast and loose band-pulleys 10 11 are mounted, and also mounted on the driving-shaft is a fly-wheel 12. The pinion 13 is connected to a sleeve 14, loosely mounted on the shaft 9, and this sleeve has a clutch member 15 for engaging with a clutch member 16, slidable on the shaft 9, but adapted to rotate therewith. As here shown, the shaft is provided with a spline 17 for engaging in an interior channel in the clutch-member section 16. This clutch member 16 has an annular channel 18 for receiving a rib 19 on the inner side of a segmental collar 20, connected to a bar 21, slidable through openings in the brackets 8. As a means for moving the bar 21 we employ toggle-links 22 23, the adjacent ends of which are connected pivotally to a block 24, the outer end of the link 22 being pivoted to a stud 25 on one of the uprights or standards 5, while the outer end of the link 23 is pivotally connected to the bar 21.

From the block 24 an arm 26 extends downward to connection with a stud 27 on the rear end of a foot-treadle 28, mounted to rock on a rod 29. A lower feeding-roller 30 has its shaft-bearings in the uprights 5, and above the roller 30 is a crushing-roller 31, and rearward of the roller 31 is an auxiliary crushing-roller 32. The roller 31 has its bearings in blocks 33, guided in vertical openings in the uprights 5. The opposite blocks 33 are connected by suitable interior threads with screws 34, which pass upward through bearings in the top plate 6. These screws are operated simultaneously to raise or lower the roller 31 with relation to the roller 30 through the agency of beveled pinions 35 36 on said screws meshing with beveled pinions 37 38 on a shaft 39, provided with a hand-wheel 40.

The roller 32 has its shaft-bearings in blocks 41, slidable in guides 42 on the machine-frame, and the said roller 32 is held yieldingly toward the roller 31 by means of springs 43, which at their inner ends engage with the blocks 41 and at their outer ends with plates 44, slidable in tubular extensions 45, and these plates 44 are engaged by screw-bolts 46, by means of which the tension of the spring 43 may be adjusted. By this yielding arrangement of the roller 32 it is obvious that the said roller 32 will move outward relatively to the roller 31 to accommodate the space to the thickness of the dough as formed by the rollers 30 and 31. On one end of the shaft of the roller 30 is a gear-wheel 47, which meshes with the pinion 13, and on the opposite end of the shaft is a gear-wheel 48, meshing with a gear-wheel 48$^a$ on a stub-shaft, and this gear-wheel 48$^a$ also engages with a gear-wheel 48$^b$ on a stub-shaft and meshing with a gear-wheel 49 on the shaft of the roller 31. These several gear-wheels 48, 48$^a$, 48$^b$, and 49 are arranged in a suitable casing 51.

The roller 32 is operated by means of a sprocket-chain 51$^a$, engaging with a sprocket-wheel 52 on the shaft of the roller 30 and with a sprocket-wheel 53 on the shaft of the roller 32. Forward of the rollers 30 and 31 is a platform or tray 54, on which the dough is placed and from which the dough is passed to the rollers 30 and 31. Underneath the roller 31 and between the rollers 30 and 32 is a curved guide-plate 55, which will direct the dough upward between the rollers 31 and 32, and above the roller 32 is a curved scraper-plate 56, designed to scrape the sheet of dough from the rollers 32, permitting said sheet of dough to pass over the roller 31, from which it is removed by a scraper 57, which engages said roller 31. The scraper 56 is mounted on a curved plate 58, from which bolts 59 pass through slots 60 in a cross-bar 61, the slots being arranged vertically, so that the scraper 56 may be adjusted relatively to the roller.

In the operation of the safety device on a downward pressure on the treadle the links will be forced upward, disengaging the clutch member 16 from the member 15 and into engagement with the fly-wheel, against which it will be tightly locked, as the adjacent pivoted ends of the links pass above the outer pivotal points of the links, as indicated by dotted lines in Fig. 1, and therefore it is obvious that the operation of the machine is quickly stopped, while the shaft continues in motion. To release this locking engagement and start the machine, the outer end of the treadle must be forced upward.

Having thus described our invention, we claim as new and desire to secure by Letters Patent—

1. A dough-breaker comprising a frame, a plurality of breaking-rollers in the frame and having gear connections one with another, a main driving-shaft, a pinion loosely mounted on said driving-shaft, a gear-wheel on the shaft of one of the rollers and meshing with said pinion, a clutch member carried by the pinion, a clutch member slidable on the shaft but rotating therewith, a shifting rod for the last-named clutch member, and a treadle for operating said rod.

2. A dough-breaker comprising a frame, a plurality of breaking-rollers mounted in the frame, gear connections between the rollers, a driving-shaft, a pinion loosely mounted on said shaft, a gear-wheel on the shaft of one of the rollers and meshing with said pinion, a clutch member carried by the pinion, a companion clutch member slidable on the shaft but rotating therewith, the said companion clutch member having an annular channel, a collar having an interior rib for engaging in said channel, a sliding bar to which the collar is attached, a treadle, a link having connection with a part extended upward from the treadle and also having pivotal connection with a fixed part of the machine-frame, and another link having connection with a sliding rod and also with said upwardly-extended part from the treadle.

3. A dough-breaker comprising a frame, a lower roller mounted in the frame, an upper roller mounted in the frame, vertically-adjustable bearing-blocks for said upper roller, a rear roller, spring-yielding bearing-blocks for said rear roller, gear connections between the several rollers, a curved guide-plate between the lower and rear rollers, a scraper, a curved plate coacting with the rear roller, and a scraper coacting with the upper roller.

4. In a dough-breaker, a frame, a lower roller mounted in the frame, an upper roller in the frame, a rear roller in the frame, spring yielding bearings for the rear roller, gear-wheels on the shafts of the upper and lower rollers meshing one with another, sprocket-wheels on the shafts of the lower and rear rollers, and a sprocket-chain for engaging with said sprocket-wheels.

In testimony whereof we have signed our names to this specification in the presence of two subscribing witnesses.

LUCIUS A. ROCKWELL.
JOHN J. LINDEN.

Witnesses as to the signature of Lucius A. Rockwell:
   JNO. M. RITTER,
   C. R. FERGUSON.

Witnesses as to the signature of John J. Linden:
   F. W. HANAFORD,
   C. R. FERGUSON.